United States Patent
Schroeder et al.

(10) Patent No.: US 9,581,328 B2
(45) Date of Patent: Feb. 28, 2017

(54) HIGH EFFICIENCY FEEDWATER HEATER

(75) Inventors: Joseph E. Schroeder, Union, MO (US); Yuri M. Rechtman, Chesterfield, MO (US)

(73) Assignee: Nooter/Eriksen, Inc., Fenton, MO (US)

( * ) Notice: Subject to any disclaimer, the term of this patent is extended or adjusted under 35 U.S.C. 154(b) by 1615 days.

(21) Appl. No.: 13/257,666

(22) PCT Filed: Mar. 19, 2008

(86) PCT No.: PCT/US2008/057412
§ 371 (c)(1),
(2), (4) Date: Sep. 20, 2011

(87) PCT Pub. No.: WO2008/118701
PCT Pub. Date: Oct. 2, 2008

(65) Prior Publication Data
US 2012/0037097 A1     Feb. 16, 2012

Related U.S. Application Data

(60) Provisional application No. 60/896,437, filed on Mar. 22, 2007.

(51) Int. Cl.
| | | |
|---|---|---|
| *F22D 1/00* | (2006.01) |
| *F01K 7/40* | (2006.01) |
| *F22B 29/06* | (2006.01) |
| *F01K 3/24* | (2006.01) |

(52) U.S. Cl.
CPC .............. *F22D 1/003* (2013.01); *Y02E 20/16* (2013.01)

(58) Field of Classification Search
None
See application file for complete search history.

(56) References Cited

U.S. PATENT DOCUMENTS

| | | | | |
|---|---|---|---|---|
| 3,070,969 A | * | 1/1963 | Ashley et al. | .................. 62/537 |
| 3,084,742 A | | 4/1963 | Davies et al. | |
| 3,177,659 A | * | 4/1965 | Berman | ..................... 60/39.182 |
| 3,259,181 A | * | 7/1966 | Ashley et al. | ........... 165/104.25 |
| 3,389,059 A | * | 6/1968 | Goeldner | ......................... 203/1 |
| 3,686,867 A | * | 8/1972 | Hull | ............................... 60/667 |
| 3,756,023 A | * | 9/1973 | Berman | ......................... 60/665 |
| 3,769,795 A | * | 11/1973 | Rostrom | ........................ 60/665 |

(Continued)

FOREIGN PATENT DOCUMENTS

| | | | | |
|---|---|---|---|---|
| EP | 0400370 A2 | * | 10/1990 | ............. F01K 23/10 |
| EP | 0400370 A2 | | 12/1990 | |

(Continued)

OTHER PUBLICATIONS

EPO Examination Report dated Jan. 9, 2015, for corresponding European Patent Application No. 08 732 441.4.

*Primary Examiner* — Gregory Huson
*Assistant Examiner* — Eric Gorman
(74) *Attorney, Agent, or Firm* — Polster Lieder Woodruff & Lucchesi, L.C.

(57) ABSTRACT

A feedwater heater (10) for a steam generator communicating feedwater through an external heat exchanger (12), a deaerator (14) that allows the use of carbon steel feedwater tubes, a first heater (16), an evaporator section (18) and steam drum (17) for communicating a portion of the feedwater in the form of steam to the deaerator (14), and a second heater (20).

36 Claims, 4 Drawing Sheets

(56) References Cited

U.S. PATENT DOCUMENTS

| | | | | |
|---|---|---|---|---|
| 3,803,846 A * | 4/1974 | Letvin | | 60/685 |
| 3,951,753 A * | 4/1976 | Roller | | 203/7 |
| 3,953,966 A * | 5/1976 | Martz et al. | | 60/783 |
| 3,955,358 A * | 5/1976 | Martz et al. | | 60/39.182 |
| 3,965,675 A * | 6/1976 | Martz et al. | | 60/39.182 |
| 3,974,644 A * | 8/1976 | Martz et al. | | 60/39.182 |
| 4,013,877 A * | 3/1977 | Uram et al. | | 700/6 |
| 4,028,884 A * | 6/1977 | Martz et al. | | 60/39.182 |
| 4,031,404 A * | 6/1977 | Martz et al. | | 290/40 R |
| 4,047,005 A * | 9/1977 | Heiser et al. | | 700/288 |
| 4,057,966 A * | 11/1977 | Prutkovsky et al. | | 60/678 |
| 4,121,913 A * | 10/1978 | Spevack | | 95/162 |
| 4,201,924 A * | 5/1980 | Uram | | 290/40 R |
| 4,290,390 A * | 9/1981 | Juzi | | 122/406.4 |
| 4,427,495 A * | 1/1984 | Masero | | 203/11 |
| 4,455,614 A * | 6/1984 | Martz et al. | | 700/288 |
| 4,555,906 A | 12/1985 | Martens et al. | | |
| 4,576,124 A * | 3/1986 | Martens et al. | | 122/406.5 |
| 4,635,589 A * | 1/1987 | Draper et al. | | 122/356 |
| 4,637,212 A * | 1/1987 | Aguet | | 60/655 |
| 4,638,630 A * | 1/1987 | Martens et al. | | 60/39.182 |
| 4,660,511 A * | 4/1987 | Anderson | | 122/420 |
| 4,745,757 A * | 5/1988 | Kim | | 60/667 |
| 4,873,829 A * | 10/1989 | Williamson | | 60/670 |
| 4,896,500 A * | 1/1990 | Pavel et al. | | 60/39.182 |
| 4,932,204 A * | 6/1990 | Pavel et al. | | 60/772 |
| 4,961,311 A * | 10/1990 | Pavel et al. | | 60/39.182 |
| 4,976,100 A * | 12/1990 | Lee | | 60/772 |
| 5,084,187 A * | 1/1992 | Wilensky | | 210/768 |
| 5,159,897 A * | 11/1992 | Franke et al. | | 122/367.3 |
| 5,167,838 A * | 12/1992 | Wilensky | | 210/768 |
| 5,628,183 A * | 5/1997 | Rice | | 60/39.182 |
| 5,762,031 A * | 6/1998 | Gurevich | | 122/7 R |
| 5,799,481 A * | 9/1998 | Fetescu | | 60/783 |
| 5,839,269 A * | 11/1998 | Frutschi | | 60/783 |
| 5,918,570 A * | 7/1999 | Gilchrist | | 122/452 |
| 6,223,519 B1 * | 5/2001 | Basu | | F01K 23/10 60/39.12 |
| 6,233,938 B1 * | 5/2001 | Nicodemus | | 60/651 |
| 6,237,321 B1 * | 5/2001 | Schmid et al. | | 60/783 |
| 6,363,711 B2 * | 4/2002 | Schmid et al. | | 60/39.182 |
| 6,938,417 B2 * | 9/2005 | Watanabe et al. | | 60/597 |
| 7,021,056 B2 * | 4/2006 | Watanabe et al. | | 60/597 |
| 7,591,309 B2 * | 9/2009 | Minnich et al. | | 166/266 |
| 7,637,233 B2 * | 12/2009 | Albrecht et al. | | 122/467 |
| 8,534,039 B1 * | 9/2013 | Pierson | | F02C 3/28 60/39.182 |
| 8,820,078 B1 * | 9/2014 | Duffy | | 60/646 |
| 2002/0029572 A1 * | 3/2002 | Kangai | | F28B 11/00 60/685 |
| 2006/0010868 A1 * | 1/2006 | Smith | | 60/645 |
| 2006/0076428 A1 * | 4/2006 | Knight et al. | | 237/19 |
| 2006/0144043 A1 * | 7/2006 | Takeuchi et al. | | 60/597 |
| 2008/0277261 A1 * | 11/2008 | Paxton | | 202/180 |
| 2009/0038287 A1 * | 2/2009 | Sasaki et al. | | 60/39.53 |
| 2009/0211252 A1 * | 8/2009 | Tani et al. | | 60/645 |
| 2011/0179799 A1 * | 7/2011 | Allam et al. | | 60/772 |
| 2012/0255309 A1 * | 10/2012 | Venetos | | F03G 6/065 60/772 |
| 2012/0312019 A1 * | 12/2012 | Rechtman | | 60/605 |
| 2013/0125842 A1 * | 5/2013 | Frick | | F22B 1/00 122/7 R |
| 2014/0110092 A1 * | 4/2014 | John et al. | | 165/138 |
| 2015/0144076 A1 * | 5/2015 | Erickson | | F28B 11/00 122/456 |

FOREIGN PATENT DOCUMENTS

| | | |
|---|---|---|
| JP | 59101513 A | 6/1984 |
| WO | WO 2008/118701 | 10/2008 |

* cited by examiner

HIGH EFFICIENCY FEEDWATER HEATER

CROSS-REFERENCE TO RELATED APPLICATIONS

This application derives and claims priority from International Application PCT/US2008/057412, filed 19 Mar. 2008, and published under International Publication Number WO 2008/118701 A2, and from U.S. provisional application 60/896,437 filed 22 Mar. 2007, entitled HIGH EFFICIENCY FEEDWATER HEATER and which are both incorporated herein by reference.

BACKGROUND ART

The invention relates in general to steam generators or boilers and more particularly to a feedwater heater and feedwater heating process for a heat recovery steam generator.

Natural gas represents a significant fuel to produce of electrical energy in the United States. It burns with few emissions, and is available throughout much of the country. Moreover, the plants which convert it into electrical energy are efficient and, in comparison to hydroelectric projects and coal-fired plants, they are relatively easy and inexpensive to construct. In the typical plant, the natural gas burns in a gas turbine, causing the rotor of the turbine to revolve and power an electrical generator to which the rotor is connected. Turbine exhaust gases—essentially air, carbon dioxide and steam—leave the gas turbine at about 1200° F. (649° C.) and are a significant source of energy. To harness this energy, the typical combined cycle, gas-fired, power plant also has a heat recovery steam generator (HRSG) through which the hot exhaust gases pass to produce steam which powers a steam turbine which, in turn, powers another electrical generator. The exhaust gases leave the HRSG at temperatures as low as 150° F. (66° C.).

The steam turbine and the HRSG operate within a loop that also contains a condenser and a feedwater pump. The steam generated by the HRSG passes through the turbine and then into the condenser where it is condensed back into liquid water. The pump delivers that water to the HRSG at about 100° F. (38° C.) or perhaps a lower temperature. The water enters the HRSG at a feedwater heater or economizer which elevates its temperature for subsequent conversion into steam within an evaporator and superheater that are also part of the HRSG.

Often the feedwater requires deaeration with a deaerator to remove dissolved gases from the feedwater to prevent corrosion of the system. Feedwater entering a deaerator needs to be approximately 20° F. below the deaerator operating temperature for proper operation. The temperatures shown in FIG. 1 are merely illustrative as the temperatures can vary depending on the application.

Generally, feedwater heaters have tubes produced from costly high alloy material to withstand the dissolved gases in feedwater, such as a high oxygen concentration. Therefore, it would be advantageous to remove the dissolved gases from the feedwater so that feedwater heater tubes can be produced using more economical materials, such as carbon steel.

The exhaust gas in an HRSG includes carbon dioxide and water in the vapor phase, but also includes traces of sulfur in the form of sulfur dioxide and trioxide. Those sulfur compounds, if combined with water, produce sulphuric acid which is highly corrosive. As long as the temperatures of the heating surfaces remain above the acid dew point temperature of the exhaust gas, $SO_2$ and $SO_3$ pass through the HRSG without harmful effects. But if any surface drops to a temperature below the acid dew point temperature, sulphuric acid will condense on that surface and corrode it.

Dew point temperatures vary depending on the fuel that is consumed. For natural gas, because of the sulphuric acid content the temperature of the heating surfaces should not fall below about 140° F.

Generally, an HRSG comprises a casing having an inlet and an outlet and a succession of heat exchangers-namely a superheater, an evaporator, and a feedwater heater arranged in that order within the casing between the inlet and outlet.

Such heat exchangers for an HRSG can have multiple banks of coils, the last of which in the direction of the gas flow can be a feedwater heater. Surfaces vulnerable to corrosion by sulphuric acid do exist on the feedwater heater. The feedwater heater receives condensate that is derived from low-pressure steam discharged by the steam turbine, and elevates the temperature of the water. Then the warmer water from the feedwater heater flows into one or more evaporators that convert it into saturated steam. That saturated steam flows on to the superheater which converts it into superheated steam. From the superheater, the superheated steam flows to the steam turbine.

In this process, by the time the hot gas reaches the feedwater heater at the back end of the HRSG, its temperature is quite low. However, that temperature should not be so low that acids condense on the heating surfaces of the feedwater heater.

Generally, in the above-discussed process, most HRSGs produce superheated steam at three pressure levels-low pressure (LP), intermediate pressure (IP) and high pressure (HP). An HRSG can thus have a superheater and also can have what are termed an LP Evaporator, an HP Economizer, and an IP Economizer. The feedwater heater typically discharges some of the heated feedwater directly into an LP evaporator.

A feedwater heater, or preheater, in a steam generator extracts heat from low temperature gases to increase the temperature of the incoming condensate before it goes off to the LP evaporator, HP economizer, or IP economizer. Multiple methods have been used to increase the temperature of the condensate before it enters any part of the preheater tubes within the gas path (e.g., recirculation pump, external heat exchanger). These methods are used to prevent the exhaust gas temperature from dropping below the acid dew point and causing sulphuric acid corrosion.

An overall illustration of a system which features use in a heat-recovery steam generator (HRSG) appears in U.S. Pat. No. 6,508,206 B1 (hereafter "'206 Patent"). FIG. 4 of the '206 Patent illustrates an arrangement with a superheater 18 located at the farthest position upstream. FIG. 4 of the present application generally refers to members such as a superheater and IP Economizer as upstream coils UC.

FIG. 3 of the present application shows a layout perspective similar to that shown in FIG. 3 of the '206 Patent. FIG. 3 of the present application discloses a gas turbine G that discharges hot exhaust gases into an "HRSG", which extracts heat from the gases to produce steam to power a steam turbine S. The gas turbine G and steam turbine S power the generators E that are capable of producing electrical energy. The steam turbine S discharges steam at a low temperature and pressure into a condenser CN, where it is condensed into liquid water. The condenser CN is in flow connection with a condensate pump CP that directs the water back to the HRSG as feedwater. That water can pass through an external water-to-water heat exchanger EWTWEX that is located outside of the casing CS, and thus is external to the internal exhaust gas flow path through the HRSG duct.

The HRSG has a casing CS within which are heat exchangers. Hot gases, such as discharged from a gas turbine, enter the casing CS and pass through a duct having an inlet IN and an outlet OT. During such process, that gas passes through heat exchangers.

The casing CS of the HRSG generally will have a floor F, a roof R, and sidewalls that extend upwardly from the floor F to the roof R. The heat exchangers are positioned within the casing CS. The floor F and roof R extend between the sidewalls so that the floor F, sidewalls and roof R help to form the internal duct of the casing CS of the HRSG, through which the exhaust gas passes.

Generally, the heat exchangers comprise coils that have a multitude of tubes that usually are oriented vertically and arranged one after the other transversely across the interior of the casing CS. The coils are also arranged in rows located one after the other in the direction of the hot gas flow depicted by the arrows in FIGS. 3 and 4 of the present application. The tubes contain water in whatever phase its coils are designed to accommodate. The length of the tubes can be as great as 80' tall.

BRIEF DESCRIPTION OF THE DRAWINGS

In the accompanying drawings which form part of the specification.

Corresponding reference numerals indicate corresponding parts throughout the several figures of the drawings.

BEST MODE FOR CARRYING OUT THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 2:
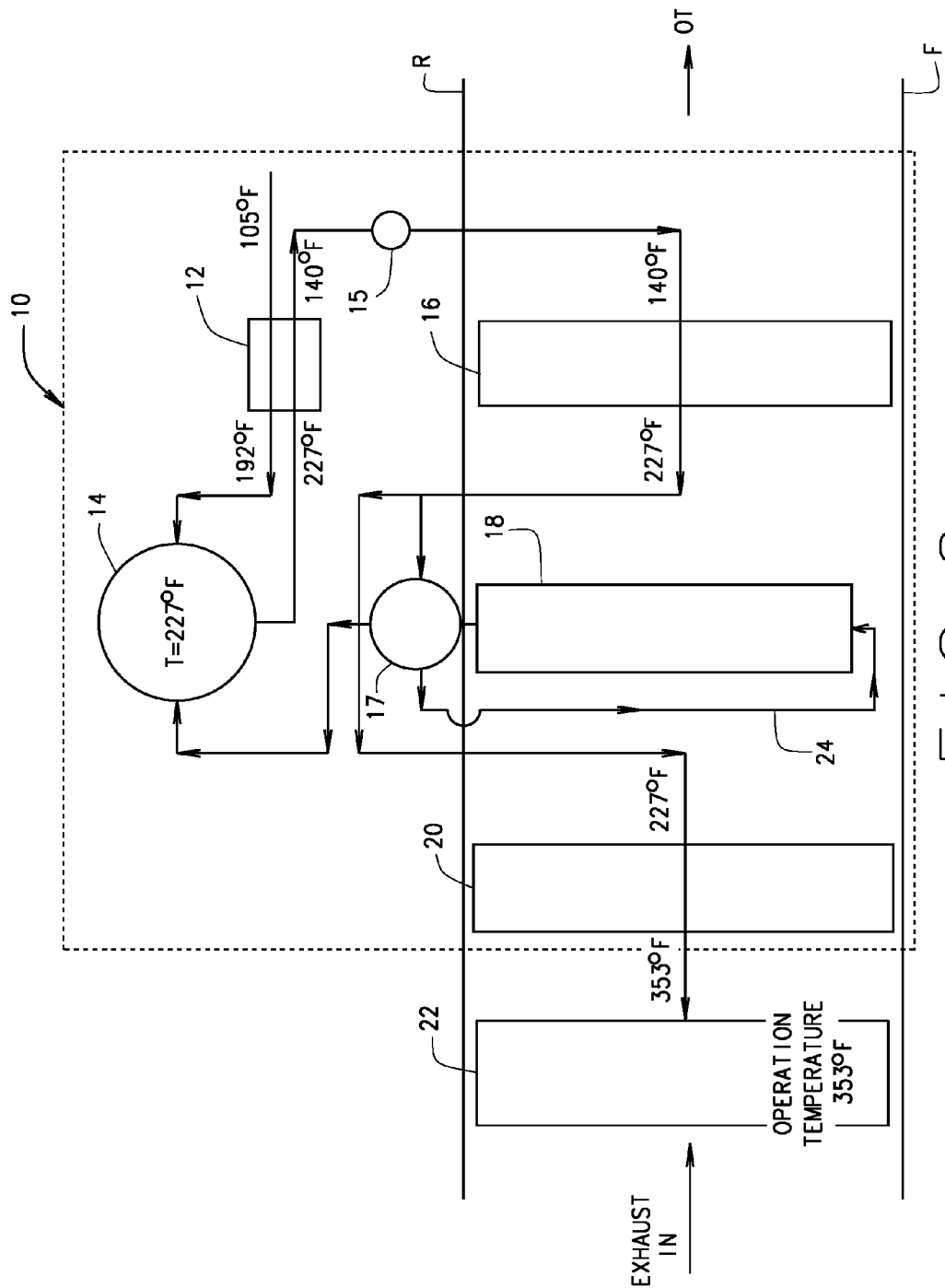
FIG. 2 is a schematic of a prior art feedwater heater configuration for a heat recovery system generator in accordance with the present invention.
Figure 3:
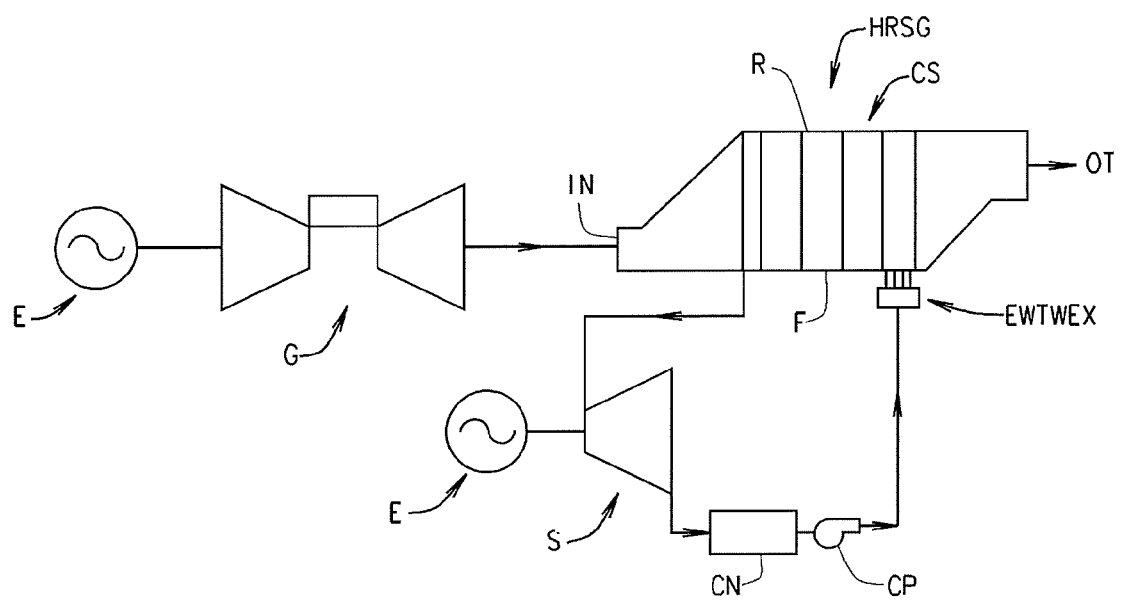
FIG. 3 is a schematic of a power system that uses an HRSG that can use the present invention.
Figure 4:
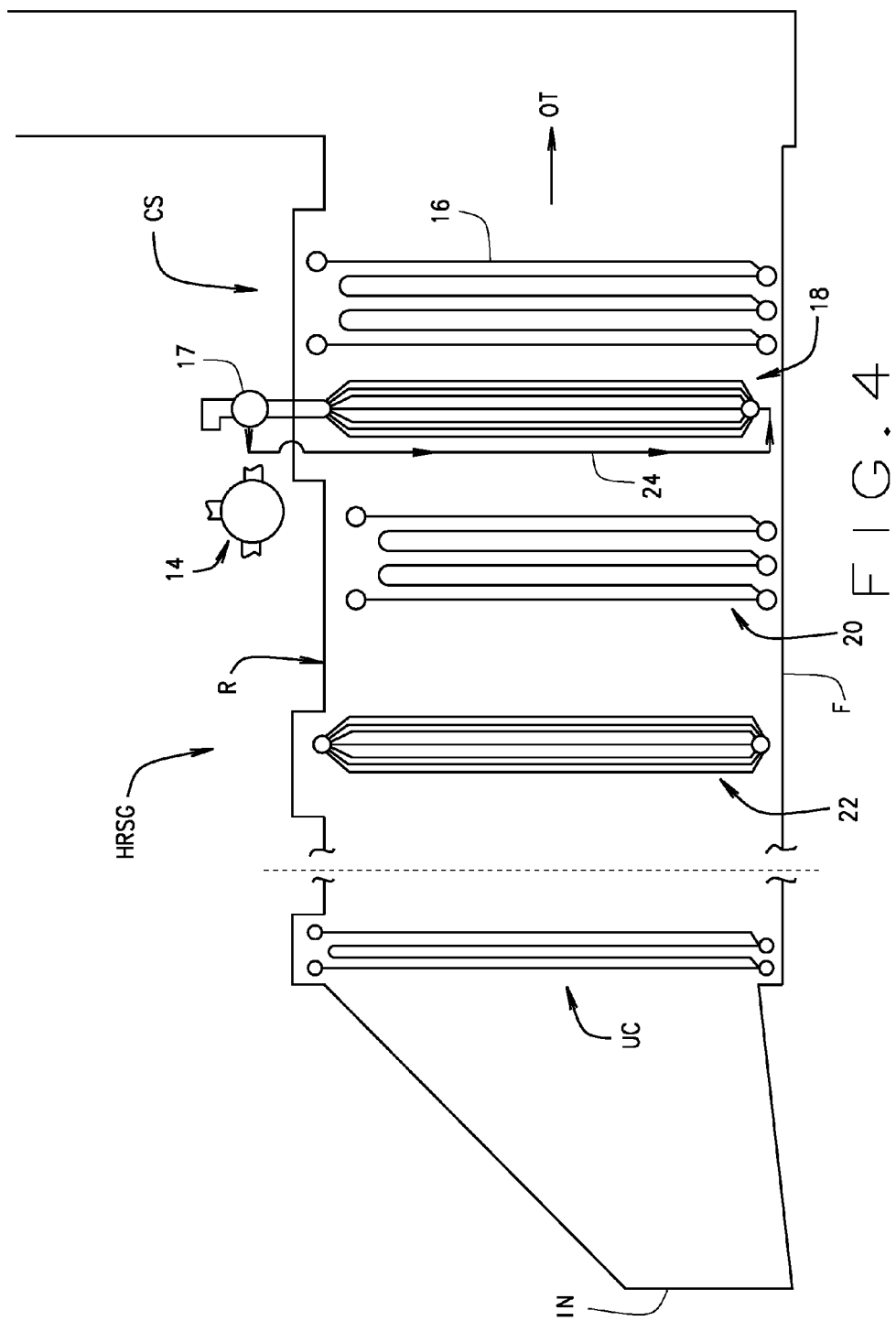
FIG. 4 is a sectional view of an HRSG provided with a feedwater heater constructed in accordance with and having an embodiment of the invention.

FIG. 2 shows an embodiment of the present invention, generally referred to as a high efficiency feedwater heater 10 for a Heat Recovery Steam Generator (HRSG). An external heat exchanger 12 heats incoming feedwater, preferably from about 105° F. to about 192° F., which then flows from the external heat exchanger 12 into a deaerator 14 for removing oxygen from the feedwater. From the deaerator 14, feedwater flows through the external exchanger 12 to cool the feedwater down, preferably from about 227° F. to about 140° F. A pump 15 delivers feedwater to the a first stage heater 16 which heats the feedwater from about 140° F. to about 227° F. A designated portion of the feedwater from the first stage heater 16 flows to a steam drum 17 and feedwater evaporator 18 through a flow conduit 24 extending from steam drum 17 to the inlet of evaporator 18, which combination of the evaporator 18 and steam drum 17 communicates the feedwater in the form of steam to the deaerator 14. The balance of the feedwater from the first stage heater 16 flows through a second stage heater 20, which heats the feedwater from about 227° F. to about 353° F., to an LP evaporator 22.

With this approach, only deaerated water flows through the feedwater heater sections. Thus, the feedwater heater tubes can comprise carbon steel, or other suitable material, rather than higher cost high alloy material. The savings of using carbon steel tubes instead of high alloy tubes in the heater coils offsets the cost of adding the feedwater evaporator, pump, and external exchanger to the HRSG. It also avoids stress corrosion cracking associated with some high alloy heater tubes.

Moreover, the steam drum 17 and feedwater evaporator 18 can be chemically treated with solid alkalis such as phosphates or caustic, thereby, reducing the possibility of flow accelerated corrosion. Flow accelerated corrosion is a major problem in low pressure evaporators without solid alkali chemical treatment. The Electric Power Research Institute (EPRI), an independent, nonprofit center for public interest energy and environmental research, recommends the use of solid alkalis in its most recent HRSG water chemistry guidelines. If there is no concern of chemically treating the feedwater evaporator 18 with solid alkalis, the feedwater evaporator circulation can be through the deaerator 14 and a separate steam drum 17 can be omitted.

In the embodiment of FIG. 2, the deaerator 14 and external heat exchanger 12 do not need to be located on top of the HRSG. Even though relocating the deaerator 14 and exchanger 12 takes more plant plot space, this can result in savings in comparison to a conventional integral deaerator.

While FIG. 2 shows a feedwater heater 10 with a first heater 16 and a second heater 20, those skilled in the art will recognize that other configurations can be used. For example, the feedwater heater 10 can include only the first stage heater 16 or only the second stage heater 20.

Figure 1:
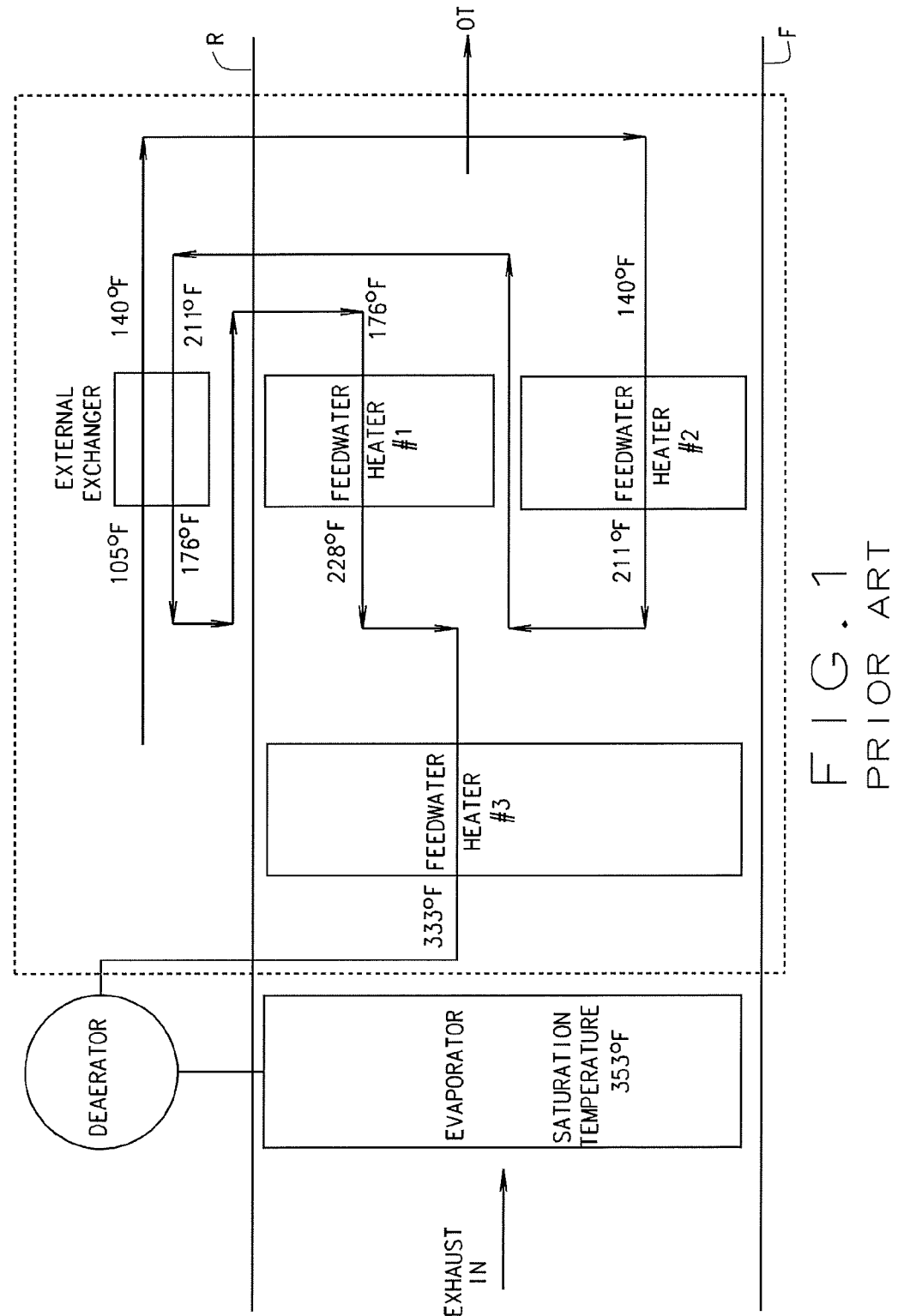
FIG. 1 is a schematic of a prior art feedwater heater configuration for a heat recovery generator.

In contrast to the prior art shown in FIG. 1, The HRSG of the present invention does not require a temperature difference between the incoming feedwater and the evaporator operating temperature because the feedwater has already been deaerated within the deaerator 14. Therefore, the previously required 20° F. approach may be reduced to 0° F. approach. Moreover, the evaporator 22 may produce more low-pressure steam than was ever possible before by preheating low pressure feedwater to saturation with the feedwater heater 10 before entering the evaporator 22 downstream.

In some steam generators the feedwater heater is referred to as an "economizer" or "feedwater preheater", and in some instances the use of "feedwater heater" or "feedwater preheater" or "economizer" depends on the location of the device in relation to the pump. Here the expression "feedwater heater" not only identifies a device of that name, but also a feedwater preheater and an economizer located downstream in the direction of gas flow from the last boiler or evaporator in a steam generator.

The feedwater heater 10 has utility beyond HRSGs used to extract heat from the gases discharged by gas turbines. Indeed, it may be used with steam generators in a wide variety of applications, including those that extract heat from the combustion of about any type of fossil fuel and with those that extract heat from the gases derived from the incineration of waste.

Changes can be made in the above constructions without departing from the scope of the invention, it is intended that all matter contained in the above description or shown in the accompanying drawings shall be interpreted as illustrative and not in a limiting sense.

The invention claimed is:

1. A feedwater heater system for a heat recovery steam generator (HRSG) which said HRSG has a casing having an inlet and an outlet and an internal gas exhaust flow path there between, comprising:
    a water-to-water heat exchanger positioned to be external to the internal gas exhaust flow path of the HRSG, the external water-to-water heat exchanger having a first inlet for receiving feedwater, a second inlet, a first outlet and a second outlet;
    a deaerator located to be external to the internal gas exhaust flow path of the HRSG, the deaerator having at least one outlet and having a first inlet, and a second inlet;
    a first conduit path configured for flow connection there through, extending from flow connection with the first outlet of the external water-to-water heat exchanger to flow connection with the first inlet of the deaerator;
    a second conduit path configured for flow connection there through, extending from the at least one deaerator outlet to flow connection with the second inlet of the external water-to-water heat exchanger;
    a first feedwater heater located within the internal gas exhaust flow path of the HRSG at a position upstream of the outlet of the HRSG, the first heater having an outlet and having an inlet;
    a feedwater evaporator comprising coils of heat exchanger tubes which are located within the internal gas exhaust flow path of the HRSG at a position upstream of the first feedwater heater, the feedwater evaporator coils having an outlet;
    a third conduit path configured for flow connection there through, extending from flow connection with the feedwater evaporator coils outlet to flow connection with the second deaerator inlet for communicating steam to the deaerator;
    a fourth conduit path configured for flow connection there through, extending from flow connection with the second outlet of the external water-to-water heat exchanger to flow connection with the inlet of the first heater;
    a second feedwater heater located within the internal gas exhaust flow path of the HRSG at a position upstream of the feedwater evaporator, the second heater having an outlet and having an inlet; and
    a fifth conduit path configured for flow connection there through, extending from flow connection with the outlet of the first heater to flow connection with the second heater inlet.

2. The feedwater heater system of claim 1, further comprising:
    a second, low pressure, evaporator positioned within the internal gas exhaust flow path to be upstream of the second feedwater heater and downstream of the inlet of the HRSG, the second low pressure evaporator having an inlet; and a sixth conduit configured for flow connection there through, extending in flow connection with the outlet of the second feedwater heater to flow connection with the inlet of the second, low pressure, evaporator.

3. The feedwater heater system of claim 2, wherein the configuration of the flow paths among the external water-to-water heat exchanger, the first and second feedwater heaters, the feedwater evaporator and the deaerator allow the temperature of the feedwater discharged from the second feedwater heater to be capable of being about the same as the operating temperature of the second, low pressure, evaporator.

4. The feedwater heater system of claim 1, further comprising, the first feedwater heater and the second feedwater heater having tubes of carbon steel.

5. The feedwater heater system of claim 1, the feedwater evaporator further comprising a steam drum located external to the internal gas exhaust flow path of the HRSG, the steam drum being positioned to be in the flow path of the third conduit to be in flow connection with the outlet of the feedwater evaporator coils and flow connection with the second inlet of the deaerator.

6. The feedwater heater system of claim 1 wherein the feedwater evaporator has an inlet for receiving water.

7. The feedwater heater system of claim 1 further comprising wherein the configuration of the external water-to-water heat exchanger, the first and second feedwater heaters and the feedwater evaporator allows the temperature of the feedwater initially entering the first inlet of the external water-to-water heat exchanger to be capable of initially having a temperature below that of the dew point of sulfuric acid in the exhaust gas, and the feedwater from the second flow path of the external water-to-water heat exchanger to the first feedwater heater to be capable of entering the inlet of the first feedwater heater at a temperature at about 140° F.

8. A feedwater heater system for a heat recovery steam generator (HRSG) which said HRSG has a casing having an inlet and an outlet and an internal gas exhaust flow path there between, comprising:
    a water-to-water heat exchanger positioned to be external to the internal gas exhaust flow path of the HRSG, the external water-to-water heat exchanger having a first inlet for receiving feedwater, a second inlet, a first outlet and a second outlet;
    a deaerator located to be external to internal gas exhaust flow path of the HRSG, the deaerator having at least one outlet and having a first inlet, and a second inlet;
    a first conduit path configured for flow connection there through, extending from flow connection with the first outlet of the external water-to-water heat exchanger to flow connection with the first inlet of the deaerator;
    a second conduit path configured for flow connection there through, extending from the at least one deaerator outlet to flow connection with the second inlet of the external water-to-water heat exchanger;
    a first feedwater heater comprising coils of heat exchanger tubes which said heat exchanger tubes are located within the internal gas exhaust flow path of the HRSG at a position upstream of the outlet of the HRSG, the first heater having an outlet and having an inlet;
    a feedwater evaporator comprising coils of heat exchanger tubes which said heat exchanger tubes are located within the internal gas exhaust flow path of the HRSG at a position upstream of the first feedwater heater, the coils of the feedwater evaporator having an outlet, the feedwater evaporator also comprising a steam drum located external to the internal gas exhaust flow path of the HRSG, the steam drum having an inlet in flow connection with the outlet of the coils of the feedwater evaporator tubes, the steam drum having an outlet;
    a third conduit path configured for flow connection there through, extending from flow connection with the outlet of the coils of the feedwater evaporator tubes through the steam drum inlet and through the steam drum outlet to flow connection with the second deaerator inlet, for communicating steam to the deaerator;

a fourth conduit path configured for flow connection there through, extending from flow connection with the second outlet of the external water-to-water heat exchanger to flow connection with the inlet of the first heater;

a second feedwater heater comprising coils of heat exchanger tubes which said heat exchanger tubes are located within the internal gas exhaust flow path of the HRSG at a position upstream of the feedwater evaporator, the second heater having an outlet and having an inlet; and a fifth conduit path configured for flow connection there through, extending from flow connection with the outlet of the first feedwater heater to flow connection with the second feedwater heater inlet;

a second, low pressure, evaporator comprising coils of heat exchanger tubes which said heat exchanger tubes are positioned within the internal gas exhaust flow path to be upstream of the second feedwater heater and downstream of the inlet of the HRSG, the second low pressure evaporator having an inlet; and a sixth conduit configured for flow connection there through, extending in flow connection with the outlet of the second feedwater heater to flow connection with the inlet of the second, low pressure, evaporator.

9. The feedwater heater system of claim 8, wherein the configuration of the flow paths among the external water-to-water heat exchanger, the first and second feedwater heaters, the feedwater evaporator and the deaerator allow the temperature of the feedwater discharged from the second feedwater heater to be capable of being about the same as the operating temperature of the second, low pressure, evaporator.

10. The feedwater heater system of claim 8, further comprising, the first feedwater heater and the second feedwater heater having tubes of carbon steel.

11. The feedwater heater system of claim 9 wherein the configuration of the external water-to-water heat exchanger, the first and second heaters and the feedwater evaporator allows the temperature of the feedwater to be capable of initially having a temperature below that of the dew point of sulfuric acid in the exhaust gas, and the feedwater from the second flow path of the external water-to-water heat exchanger to the first heater to be capable of entering the inlet of the first heater at a temperature at about 140° F.

12. A process for heating feedwater for a heat recovery steam generator (HRSG) which said HRSG has a casing having an inlet and an outlet and an internal gas exhaust flow path there between, comprising:

a water-to-water heat exchanger positioned to be external to the internal gas exhaust flow path of the HRSG, the external water-to-water heat exchanger having a first flow path and a second flow path, a first inlet for receiving feedwater, a second inlet, a first outlet and a second outlet;

a deaerator positioned to be external to the internal gas exhaust flow path of the HRSG, the deaerator having at least one outlet and having a first inlet, and a second inlet;

a first feedwater heater located within the internal gas exhaust flow path of the HRSG at a position upstream of the outlet of the HRSG, the first feedwater heater having an outlet and having an inlet;

a feedwater evaporator comprising coils of heat exchanger tubes which said heat exchanger tubes are located within the internal gas exhaust flow path of the HRSG at a position upstream of the first feedwater heater;

a second feedwater heater located within the internal gas exhaust flow path of the HRSG at a position upstream of the feedwater evaporator coils of heat exchanger tubes;

a first conduit path configured for flow connection there through, extending from flow connection with the first outlet of the external water-to-water heat exchanger to flow connection with the first inlet of the deaerator;

a second conduit path configured for flow connection there through, extending from the at least one deaerator outlet to flow connection with the second inlet of the external water-to-water heat exchanger;

another conduit path configured for flow connection there through, extending from flow connection with the second outlet of the external water-to-water heat exchanger to flow connection with the inlet of the first feedwater heater;

directing the feedwater into the first flow path of the external water-to-water heat exchanger to elevate the temperature of the incoming feedwater;

directing the feedwater from the first flow path of the external water-to-water heat exchanger through the first conduit and through the first deaerator inlet into the deaerator to remove gases from the feedwater;

directing steam into the deaerator;

directing the feedwater from the at least one deaerator outlet through the second conduit to the second inlet of the external water-to-water heat exchanger to the second flow path of the external water-to-water heat exchanger to elevate the temperature of the feedwater within the first flow path of the external water-to-water heat exchanger;

directing the feedwater from the second flow path of the external water-to-water heat exchanger from the second outlet of the external water-to-water heat exchanger through the another conduit to the inlet of the first feedwater heater to elevate the temperature of the feedwater; and directing the feedwater from the first feedwater heater to the second feedwater heater to elevate the temperature of the feedwater.

13. The process for heating feedwater for the heat recovery steam generator (HRSG) of claim 12, further comprising the steps of:

a second, low pressure, evaporator positioned within the internal gas exhaust flow path to be upstream of the second feedwater heater and downstream of the inlet of the HRSG; and directing the feedwater from the second feedwater heater to the second, low pressure, evaporator, and passing the feedwater through the second low pressure evaporator to elevate the temperature of the feedwater.

14. The process for heating feedwater for the heat recovery steam generator (HRSG) of claim 12, further comprising the feedwater evaporator also comprising a steam drum located external to the internal gas exhaust flow path of the HRSG, the steam drum having an inlet in flow connection with an outlet of the coils of the feedwater evaporator tubes; and directing steam from the steam drum to the deaerator.

15. The process for heating feedwater for the heat recovery steam generator (HRSG) of claim 12, wherein the temperature of the feedwater initially entering the first inlet of the external water-to-water heat exchanger initially has a temperature below that of the dew point of sulfuric acid in the exhaust gas, and the feedwater from the second flow path of the external water-to-water heat exchanger to the first feedwater heater enters the inlet of the first feedwater heater at a temperature at about 140° F.

16. The process for heating feedwater for the heat recovery steam generator (HRSG) of claim 13 wherein the temperature of the feedwater discharged from the second feedwater heater is about the same as the operating temperature of the second, low pressure, evaporator.

17. The process for heating feedwater for the heat recovery steam generator (HRSG) of claim 15 further comprising the first feedwater heater and the second feedwater heater having tubes of carbon steel.

18. The process for heating feedwater for the heat recovery steam generator (HRSG) of claim 12 further providing the feedwater evaporator with an inlet that is in fluid flow connection with the outlet of the first feedwater heater, and providing a flow path extending from the first feedwater heater to the feedwater evaporator, and directing the feedwater from the first feedwater heater to the feedwater evaporator inlet.

19. A process for heating feedwater for a heat recovery steam generator (HRSG) which said HRSG has a casing having an inlet and an outlet and an internal gas exhaust flow path there between, comprising:
a water-to-water heat exchanger positioned to be external to the internal gas exhaust flow path of the HRSG, the external water-to-water heat exchanger having a first flow path and a second flow path, a first inlet for receiving feedwater, a second inlet, a first outlet and a second outlet;
a deaerator positioned to be external to the internal gas exhaust flow path of the HRSG, the deaerator having at least one outlet and having a first inlet, and a second inlet;
a first feedwater heater located within the internal gas exhaust flow path of the HRSG at a position upstream of the outlet of the HRSG, the first feedwater heater having an inlet and an outlet;
a feedwater evaporator comprising coils of heat exchanger tubes which said heat exchanger tubes are located within the internal gas exhaust flow path of the HRSG at a position upstream of the first feedwater heater, the feedwater evaporator tubes having an outlet, the feedwater evaporator also comprising a steam drum located external to the internal gas exhaust flow path of the HRSG, the steam drum having an inlet in flow connection with the outlet of the coils of the feedwater evaporator tubes, the steam drum having an outlet;
a second feedwater heater located within the internal gas exhaust flow path of the HRSG at a position upstream of the feedwater evaporator coils of heat exchanger tubes;
a first conduit path configured for flow connection there through, extending from flow connection with the first outlet of the external water-to-water heat exchanger to flow connection with the first inlet of the deaerator;
a second conduit path configured for flow connection there through, extending from the at least one deaerator outlet to flow connection with the second inlet of the external water-to-water heat exchanger;
another conduit path configured for flow connection there through, extending from flow connection with the second outlet of the external water-to-water heat exchanger to flow connection with the inlet of the first feedwater heater;
directing the feedwater into the first flow path of the external water-to-water heat exchanger to elevate the temperature of the incoming feedwater;
directing the feedwater from the first flow path of the external water-to-water heat exchanger through the first conduit and through the first deaerator inlet into the deaerator to remove gases from the feedwater;
directing steam through the steam drum into the deaerator;
directing the feedwater from the at least one deaerator outlet through the second conduit to the second inlet of the external water-to-water heat exchanger to the second flow path of the external water-to-water heat exchanger to elevate the temperature of the feedwater within the first flow path of the external water-to-water heat exchanger;
directing the feedwater from the second flow path of the external water-to-water heat exchanger from the second outlet of the external water-to-water heat exchanger through the another conduit to the inlet of the first feedwater heater to elevate the temperature of the feedwater;
directing the feedwater from the first feedwater heater to the second feedwater heater to elevate the temperature of the feedwater;
a second, low pressure, evaporator positioned within the internal gas exhaust flow path to be upstream of the second feedwater heater and downstream of the inlet of the HRSG;
directing the feedwater from the second feedwater heater to the second, low pressure, evaporator at a temperature that is about the same as the operating temperature of the second, low pressure, evaporator, and elevating the temperature of the feedwater in the second, low pressure, evaporator; and
providing the feedwater that initially has a temperature that is below that of the dew point of sulfuric acid in the exhaust gas, and wherein the feedwater directed from the second flow path of the external water-to-water heat exchanger to the first feedwater heater enters the inlet of the first feedwater heater at a temperature at about 140° F.

20. The process for heating feedwater for the heat recovery steam generator (HRSG) of claim 19 further comprising the first feedwater heater and the second feedwater heater having tubes of carbon steel.

21. The process for heating feedwater for the heat recovery steam generator (HRSG) of claim 19 further providing the feedwater evaporator with an inlet that is in fluid flow connection with the outlet of the first feedwater heater, and providing a flow path extending from the first feedwater heater to the feedwater evaporator, and directing the feedwater from the first feedwater heater to the feedwater evaporator inlet.

22. A feedwater heater system for a heat recovery steam generator (HRSG) which said HRSG has a casing having an inlet and an outlet and an internal gas exhaust flow path there between, comprising:
a water-to-water heat exchanger positioned to be external to the internal gas exhaust flow path of the HRSG, the external water-to-water heat exchanger having a first inlet for receiving feedwater, a second inlet, a first outlet and a second outlet;

a deaerator located to be external to the internal gas exhaust flow path of the HRSG, the deaerator having at least one outlet and having a first inlet, and a second inlet;

a first conduit path configured for flow connection there through, extending from flow connection with the first outlet of the external water-to-water heat exchanger to flow connection with the first inlet of the deaerator;

a second conduit path configured for flow connection there through, extending from the at least one deaerator outlet to flow connection with the second inlet of the external water-to-water heat exchanger;

a feedwater heater located within the internal gas exhaust flow path of the HRSG at a position upstream of the outlet of the HRSG, the feedwater heater having an outlet and having an inlet;

a feedwater evaporator comprising coils of heat exchanger tubes which are located within the internal gas exhaust flow path of the HRSG, the feedwater evaporator coils having an outlet;

a third conduit path configured for flow connection there through, extending from flow connection with the feedwater evaporator coils outlet to flow connection with the second deaerator inlet for communicating steam to the deaerator; and a fourth conduit path configured for flow connection there through, extending from flow connection with the second outlet of the external water-to-water heat exchanger to flow connection with the inlet of the feedwater heater.

23. The feedwater heater system of claim 22, further comprising:

a second, low pressure, evaporator positioned to be upstream of the feedwater heater and downstream of the inlet of the HRSG, the second low pressure evaporator having an inlet; and an additional conduit configured for flow connection there through, extending in flow connection with the outlet of the feedwater heater to flow connection with the inlet of the second, low pressure, evaporator.

24. The feedwater heater system of claim 23, wherein the configuration of the flow paths among the external water-to-water heat exchanger, the feedwater heater, the feedwater evaporator and the deaerator allow the temperature of the feedwater discharged from the feedwater heater to be capable of being about the same as the operating temperature of the second, low pressure, evaporator.

25. The feedwater heater system of claim 22, the feedwater evaporator further comprising a steam drum located external to the internal gas exhaust flow path of the HRSG, the steam drum being positioned to be in the flow path of the third conduit to be in flow connection with the outlet of the feedwater evaporator coils and flow connection with the second inlet of the deaerator.

26. The feedwater heater system of claim 22 wherein the feedwater evaporator has an inlet for receiving water.

27. The feedwater heater system of claim 22, wherein the feedwater evaporator inlet is in fluid flow connection with the outlet of the feedwater heater, and an additional flow conduit extends from the feedwater heater to the feedwater evaporator through the feedwater evaporator inlet.

28. The feedwater heater system of claim 22 further comprising wherein the configuration of the external water-to-water heat exchanger, the feedwater heater and the feedwater evaporator allows the temperature of the feedwater initially entering the first inlet of the external water-to-water heat exchanger to be capable of initially having a temperature below that of the dew point of sulfuric acid in the exhaust gas, and the feedwater from the second flow path of the external water-to-water heat exchanger to the feedwater heater to be capable of entering the inlet of the feedwater heater at a temperature at about 140° F.

29. A process for heating feedwater for a heat recovery steam generator (HRSG) which said HRSG has a casing having an inlet and an outlet and an internal gas exhaust flow path there between, comprising:

a water-to-water heat exchanger positioned to be external to the internal gas exhaust flow path of the HRSG, the external water-to-water heat exchanger having a first flow path and a second flow path, a first inlet for receiving feedwater, a second inlet, a first outlet and a second outlet;

a deaerator positioned to be external to the internal gas exhaust flow path of the HRSG, the deaerator having at least one outlet and having a first inlet, and a second inlet;

a feedwater heater located within the internal gas exhaust flow path of the HRSG at a position upstream of the outlet of the HRSG, the feedwater heater having an outlet and having an inlet;

a feedwater evaporator comprising coils of heat exchanger tubes which said heat exchanger tubes are located within the internal gas exhaust flow path of the HRSG at a position upstream of the feedwater heater;

a first conduit path configured for flow connection there through, extending from flow connection with the first outlet of the external water-to-water heat exchanger to flow connection with the first inlet of the deaerator;

a second conduit path configured for flow connection there through, extending from the at least one deaerator outlet to flow connection with the second inlet of the external water-to-water heat exchanger;

another conduit path configured for flow connection there through, extending from flow connection with the second outlet of the external water-to-water heat exchanger to flow connection with the inlet of the feedwater heater;

directing the feedwater into the first flow path of the external water-to-water heat exchanger to elevate the temperature of the incoming feedwater;

directing the feedwater from the first flow path of the external water-to-water heat exchanger through the first conduit and through the first deaerator inlet into the deaerator to remove gases from the feedwater;

directing steam into the deaerator;

directing the feedwater from the at least one deaerator outlet through the second conduit to the second inlet of the external water-to-water heat exchanger to the second flow path of the external water-to-water heat exchanger to elevate the temperature of the feedwater within the first flow path of the external water-to-water heat exchanger; and directing the feedwater from the second flow path of the external water-to-water heat exchanger from the second outlet of the external water-to-water heat exchanger through the another conduit to the inlet of the feedwater heater to elevate the temperature of the feedwater.

30. The process for heating feedwater for the heat recovery steam generator (HRSG) of claim 29, further comprising the steps of:

a second, low pressure, evaporator positioned within the internal gas exhaust flow path to be upstream of the feedwater heater and downstream of the inlet of the HRSG; and directing the feedwater from the feedwater heater to the second, low pressure, evaporator, and passing the feedwater through the second, low pressure, evaporator to elevate the temperature of the feedwater.

31. The process for heating feedwater for the heat recovery steam generator (HRSG) of claim 29, further comprising the feedwater evaporator to also comprise a steam drum located external to the internal gas exhaust flow path of the HRSG, the steam drum with an inlet in flow connection with an outlet of the coils of the feedwater evaporator tubes; and directing the feedwater from the feedwater evaporator coils through the steam drum to the deaerator in the form of steam.

32. The process for heating feedwater for the heat recovery steam generator (HRSG) of claim 29, wherein the temperature of the feedwater initially entering the first inlet of the external water-to-water heat exchanger initially has a temperature below that of the dew point of sulfuric acid in the exhaust gas, and the feedwater from the second flow path of the external water-to-water heat exchanger to the feedwater heater enters the inlet of the feedwater heater at a temperature at about 140° F.

33. The process for heating feedwater for the heat recovery steam generator (HRSG) of claim 32 wherein the temperature of the feedwater discharged from the feedwater heater is about the same as the operating temperature of the second, low pressure, evaporator.

34. The process for heating feedwater for the heat recovery steam generator (HRSG) of claim 29 further comprising the feedwater evaporator with an inlet that is in fluid flow connection with the outlet of the feedwater heater, and a flow path extending from the feedwater heater to the feedwater evaporator, and directing the feedwater from the feedwater heater to the feedwater evaporator inlet.

35. The feedwater heater system of claim 5, wherein a flow conduit extends from the steam drum to the feedwater evaporator to provide fluid flow connection there through from the steam drum into the feedwater evaporator.

36. The process for heating feedwater for the heat recovery steam generator (HRSG) of claim 14, wherein a flow conduit extends from the steam drum to the feedwater evaporator, further comprising the steps of:

directing deaerated fluid from the steam drum to the feedwater evaporator, and passing the deaerated fluid through the feedwater evaporator.

* * * * *